US008147080B2

(12) United States Patent
Foreman et al.

(10) Patent No.: US 8,147,080 B2
(45) Date of Patent: Apr. 3, 2012

(54) VEHICLE ENTERTAINMENT AND COMMUNICATION SYSTEM PERSONAL CONTROL UNIT WITH RACETRACK LIGHTING DESIGN

(75) Inventors: Bradley Foreman, Mission Viejo, CA (US); Hagop Sakadjian, Laguna Niguel, CA (US); Derek Nguyen, San Clemente, CA (US)

(73) Assignee: Thales Avionics, Inc., Irvine, CA (US)

( * ) Notice: Subject to any disclaimer, the term of this patent is extended or adjusted under 35 U.S.C. 154(b) by 442 days.

(21) Appl. No.: 12/416,278

(22) Filed: Apr. 1, 2009

(65) Prior Publication Data

US 2010/0253230 A1 Oct. 7, 2010

(51) Int. Cl.
*G01D 11/28* (2006.01)

(52) U.S. Cl. ............ 362/29; 362/800; 362/85; 362/253; 362/311.02; 362/488

(58) Field of Classification Search .................... 362/29, 362/26, 27, 488, 489, 491, 109, 85, 249.1, 362/249.02, 249.16, 231, 236, 253, 311.02, 362/311.01, 332, 458; 482/902
See application file for complete search history.

(56) References Cited

U.S. PATENT DOCUMENTS

| | | | | |
|---|---|---|---|---|
| 2002/0130771 | A1* | 9/2002 | Osborne et al. | 340/438 |
| 2006/0007684 | A1* | 1/2006 | Wang | 362/276 |
| 2006/0251457 | A1* | 11/2006 | Lapstun et al. | 400/88 |
| 2008/0157997 | A1* | 7/2008 | Bleacher et al. | 340/825.24 |
| 2011/0080179 | A1* | 4/2011 | Ando | 324/649 |

* cited by examiner

*Primary Examiner* — Robert May
*Assistant Examiner* — Leah S Macchiarolo
(74) *Attorney, Agent, or Firm* — Myers Bigel Sibley & Sajovec, P.A.

(57) ABSTRACT

A personal control unit (PCU) for a transportation-based entertainment system comprises a number of buttons. Illumination is provided for the buttons by illuminating a border region that is rounded containing some of the keys, and is provided for some of the buttons themselves. A light diffusion mechanism is provided between the illumination source and the illuminated regions related to the keys so that the illumination appears even across the entire PCU. A controller may adjust the illumination level and color of the illumination source. A system may be provided for matching at least one of color and brightness of the PCU lighting with cabin lighting.

22 Claims, 10 Drawing Sheets

VEHICLE ENTERTAINMENT AND COMMUNICATION SYSTEM PERSONAL CONTROL UNIT WITH RACETRACK LIGHTING DESIGN

BACKGROUND

The present invention is directed to a personal control unit (PCU) for a vehicle entertainment and communication system. The control unit is provided to each passenger in a vehicle and is used to operate various aspects of the vehicle's entertainment and passenger communication system.

Historically, various types of control units have been used to interact with a vehicle's entertainment and communication system, but these systems have generally been relatively large, difficult to operate and see, not well illuminated, and have not been visually integrated well into other aspects of the vehicle interior.

Although control units have been developed that comprise various lighting techniques, prior art units have not provided illumination of the units that is aesthetically pleasing or can easily be integrated with other aspects, particularly lighting aspects, of the vehicle interior.

SUMMARY

According to various embodiments of the present invention, a personal control unit is provided for interfacing with a vehicle's entertainment and communication system that comprises aspects that visually integrate into the vehicle interior and is easy to operate and see by the user. In particular various embodiments of the invention successfully address the ability to provide a smooth and coherent lighting effect that helps to avoid hot spots by successfully diffusing and segregating illumination in the very confined space of a practical PCU. This is achieve through various combinations of illumination source placement relative to the observable portions of the PCU and the use of various material layering, thickness, composition, and texturing.

Specifically, a personal control apparatus is provided for controlling an entertainment or communications system in a vehicle, comprising: a case; a top surface comprising a rounded and elongated region comprising: a plurality of user control elements; and one or more illumination regions; the apparatus further comprising: an illumination source located within the case, wherein illumination from the illumination source is transmitted through the one or more illumination regions to a user of the apparatus; and an illumination diffuser located between the illumination source and the illumination regions of the top surface.

A system is also provided for controlling an illuminated appearance of a user interface device for an entertainment or communications system in a vehicle, comprising: a personal control apparatus for controlling an entertainment or communications system in a vehicle, comprising: a case; an illumination source or sources located within the case, wherein illumination from the illumination source is transmitted through one or more illumination regions to a user of the apparatus; an input via which information related to at least one of color and brightness is provided; and an apparatus controller that adjusts at least one of the color and brightness of the illumination source based on the input information. The system further comprises a system controller comprising: an input connected to an other system that generates information related to at least one of light color and brightness information of cabin lighting, or a processor that generates information related to at least one of light color and brightness information of cabin lighting; a processor that provides or converts the cabin lighting information into personal control apparatus lighting information so that the personal control apparatus illumination source can mimic the cabin lighting information; and an output connected to the input of the personal control apparatus to communicate the lighting information to the personal control apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

The present invention will now be described more fully with reference to the accompanying drawings, in which exemplary embodiments of the invention are described below. In preferred embodiments of the invention, the PCU is utilized by a passenger on an airplane to access an in-flight entertainment (IFE) system that may also employ communications components. Although two embodiments of the invention are illustrated below, inventive aspects from any embodiment can be applied to any other embodiment, and the invention is not limited to any specific embodiment described below.

First Embodiment

Figure 1:
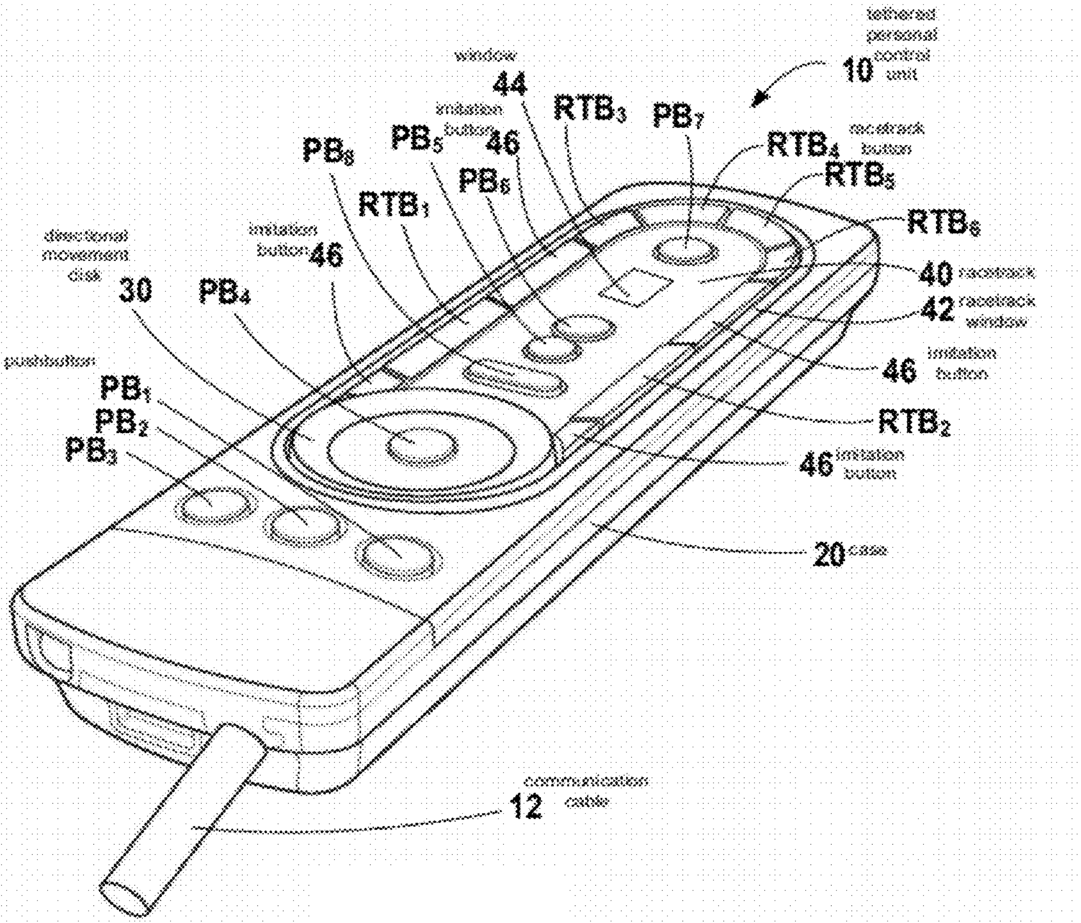
FIG. 1 is an isometric pictorial view of an embodiment of the PCU according to a tethered design.
Figure 2:
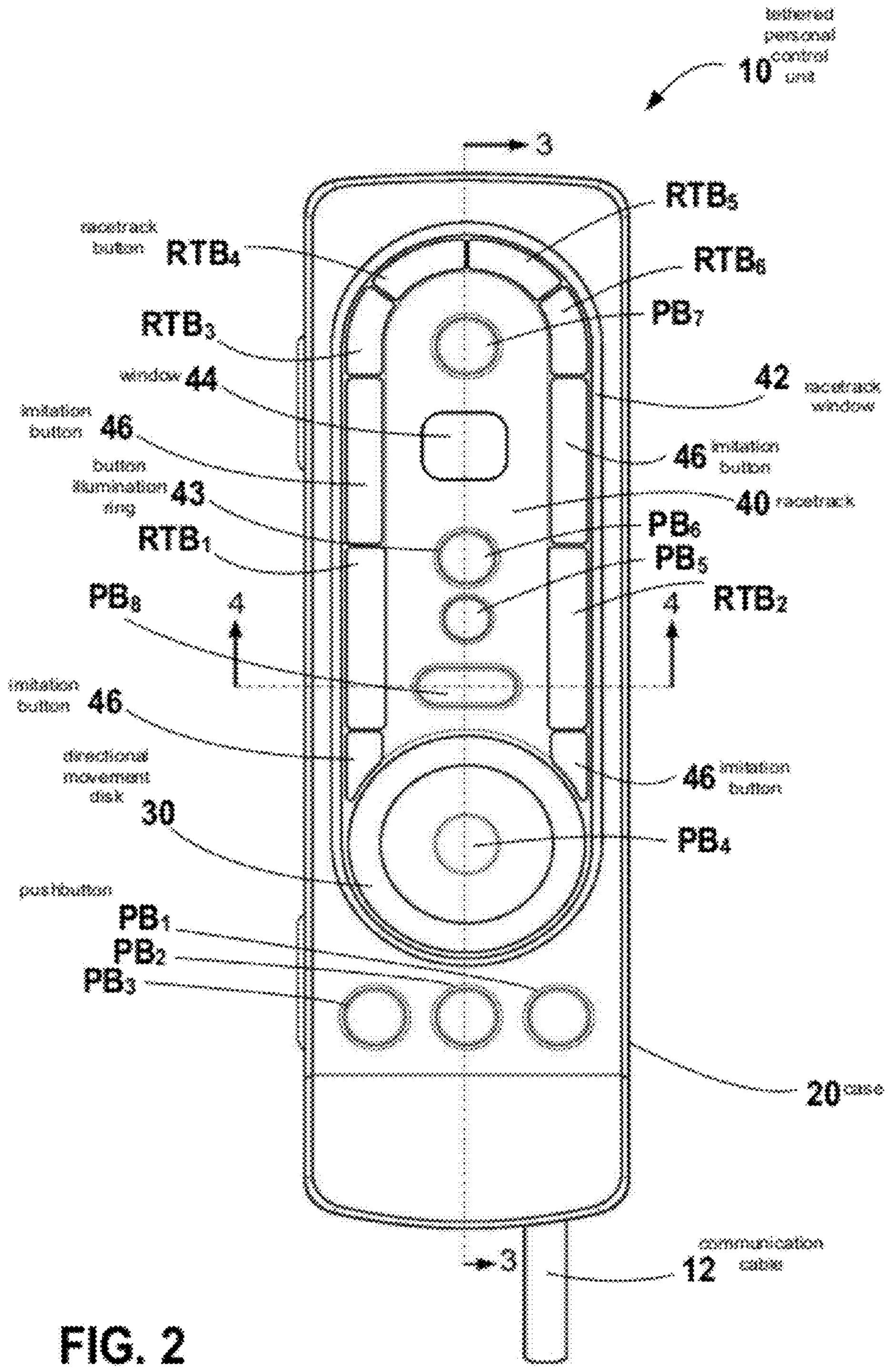
FIG. 2 is a top view of the PCU according to the embodiment shown in FIG. 1.

FIGS. 1 and 2 illustrate an exemplary embodiment of a PCU 10. The PCU 10 in FIG. 1 illustrates a communication cable 12 that can connect to some portion of a passenger seat. In an embodiment of the invention, this cable 12 may be connected to a biased take-up spool with a catch so that the cable 12 can be neatly taken up when the PCU 10 is stored. Such storage can be in a storage recess in an arm or other area of the passenger seat.

Although a cable 12 is illustrated, which may be used for communications and the power supply, the invention does not require a cable. Communications could be implemented wirelessly using any well-known wireless communications protocol (e.g., BlueTooth®, etc.), although restrictions on radio-frequency communications may be limited in certain contexts or portions of a flight. In such a system, the PCU 10 would contain a power storage unit (batteries, capacitors, etc.), and may comprise a mechanism to permit recharging, such as outside connectors, when docked.

The PCU 10 may comprise a case 20 having various cutouts for buttons and other controls. These controls can be located on the top, side, bottom, or ends of the PCU 10. In a preferred embodiment, the top region is divided into two primary regions: an end region, and a racetrack region 40, with each potentially comprising user controls. User controls can comprise any form of user input and output mechanisms, including, but not limited to, pushbuttons, joysticks, keyboards, touch-sensitive pads, light-emitting diodes, liquid crystal displays, etc.

In the embodiment shown in FIG. 1, the end region on the top of the PCU comprises three round push buttons $PB_{1-3}$ that are linearly arranged across the width of the PCU 10. The racetrack region 40 may be arranged in the form of a traditional racetrack, i.e., an elongated region having two semicircular shapes bounding each end that are joined in a middle portion with linear parallel edges, although any form of rectangle, rounded corner rectangle, ellipse, or other elongated or regular shape may be used as well.

The racetrack region 40, in the embodiment shown, comprises a number of user controls. At a first end of the racetrack 40, a rocker button in the form of a directional movement disk 30 is provided. This disk 30 may be used, e.g., for navigating in two dimensions on a video display unit by the user, and a quadrature division can permit up, down, left, and right motion. An entry button $PB_4$ may be provided at the center region of the disk 30.

Other buttons $PB_{5-8}$ may be used to provide functions such as power to the PCU 10, calling or cancelling a call for assistance, operating a reading lamp, etc. Also, a display window 44 may be used to provide basic information, such as an audio or video channel and whether or not the PCU is in an audio mode or a video mode.

Another group of buttons $RTB_{1-6}$ may be provided that conform to the racetrack shape. These buttons can control media operation (pause, play, fast-forward, rewind, stop) and functions such as volume control and channel selection. These buttons can possibly be rocker buttons as well. For example, $RTB_1$ could be implemented so that pushing on one end of the button increases the volume, whereas pushing on the other end of the button decreases the volume.

The overall design of the racetrack region 40 may be further supported by imitation buttons 46 that do not perform any function, but rather are present in order to support the overall design of the racetrack region. Of course, these imitation buttons 46 could be replaced by functioning buttons as well.

Figures 3A, 3B, 3C:
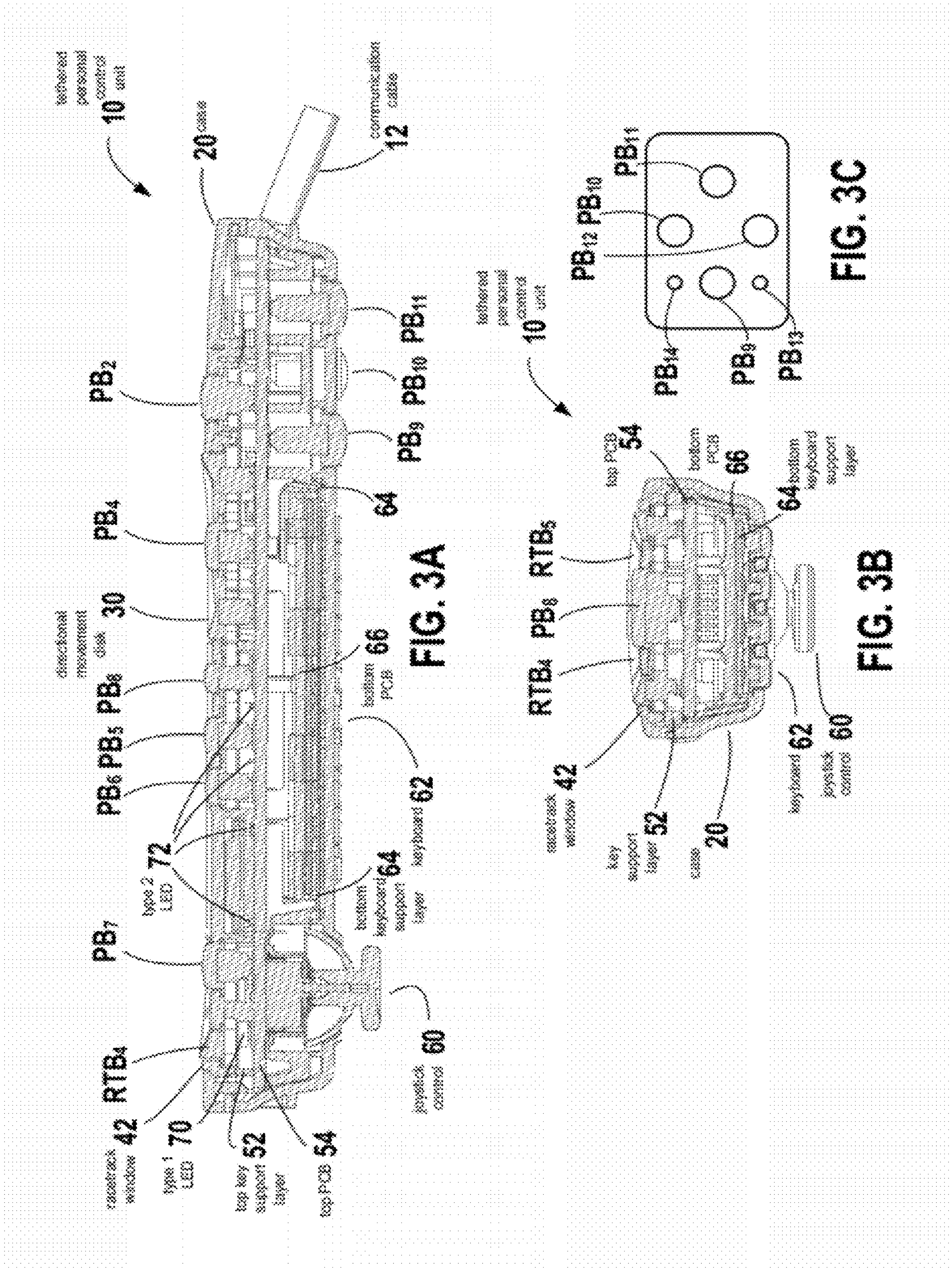
FIG. 3A is a cross-sectional view along line 3-3 shown in FIG. 2.
FIG. 3B is a cross-sectional view along line 4-4 shown in FIG. 2.
FIG. 3C is a bottom view of a regional area of one end of the PCU.

FIGS. 3A and 3B are respectively horizontal and vertical cross-sectional views of the PCU 10. A keyboard 62, such as a qwerty keyboard, may be provided on the bottom side that can be used to enter data by the user. A joystick control 60 may be provided for, e.g., cursor movement or for gaming operations. Finally, additional pushbuttons $PB_{9-14}$ (see also FIG. 3C) may be provided on a bottom side of the PCU 10.

The following table provides exemplary uses for the buttons identified above, although it is to be understood that any relevant functions can be assigned to any of the particular buttons.

TABLE 1

| | |
|---|---|
| $PB_1$ | brightness |
| $PB_2$ | map—sends user to the moving map display |
| $PB_3$ | home button—returns the user to the home page which is displayed on the seat video display unit (SVDU) |
| $PB_4$ | enter/accept/OK |
| $PB_5$ | cancel call attendant |
| $PB_6$ | call attendant |
| $PB_7$ | power |
| $PB_8$ | seat light |
| $RTB_1$ | volume control |
| $RTB_2$ | channel control |
| $RTB_3$ | fast forward |
| $RTB_4$ | pause/play toggle |
| $RTB_5$ | stop |
| $RTB_6$ | rewind |

Exemplary Button Functions

Another feature of the racetrack region 40 is the racetrack window 42, which is a clear or translucent region that borders the racetrack region 40. In a preferred embodiment, this racetrack window 42 is formed around an outer edge of the racetrack buttons $RTB_{1-6}$ although such a window 42 could alternately or additionally be provided around an inner edge of the racetrack buttons $RTB_{1-6}$ as well. The racetrack window 42 could further be provided around the other buttons of the racetrack region 40 as well.

The primary purpose of the racetrack window 42 is to provide lighting effects to the PCU 10, however, it is desirable to not have alternating regions of lightness and darkness along this window 42, but rather to have light emanating through the racetrack window 42 be very diffuse and form a generally uniform level of illumination over its entire area.

Thus, the racetrack window 42 is constructed of a transparent or a translucent material. This could be any form of glass, plastic, rubber, etc., although in a preferred embodiment, it is some form of polycarbonate. The structure of the window 42 and surrounding structure are described in more detail below.

Figures 4A, 4B:
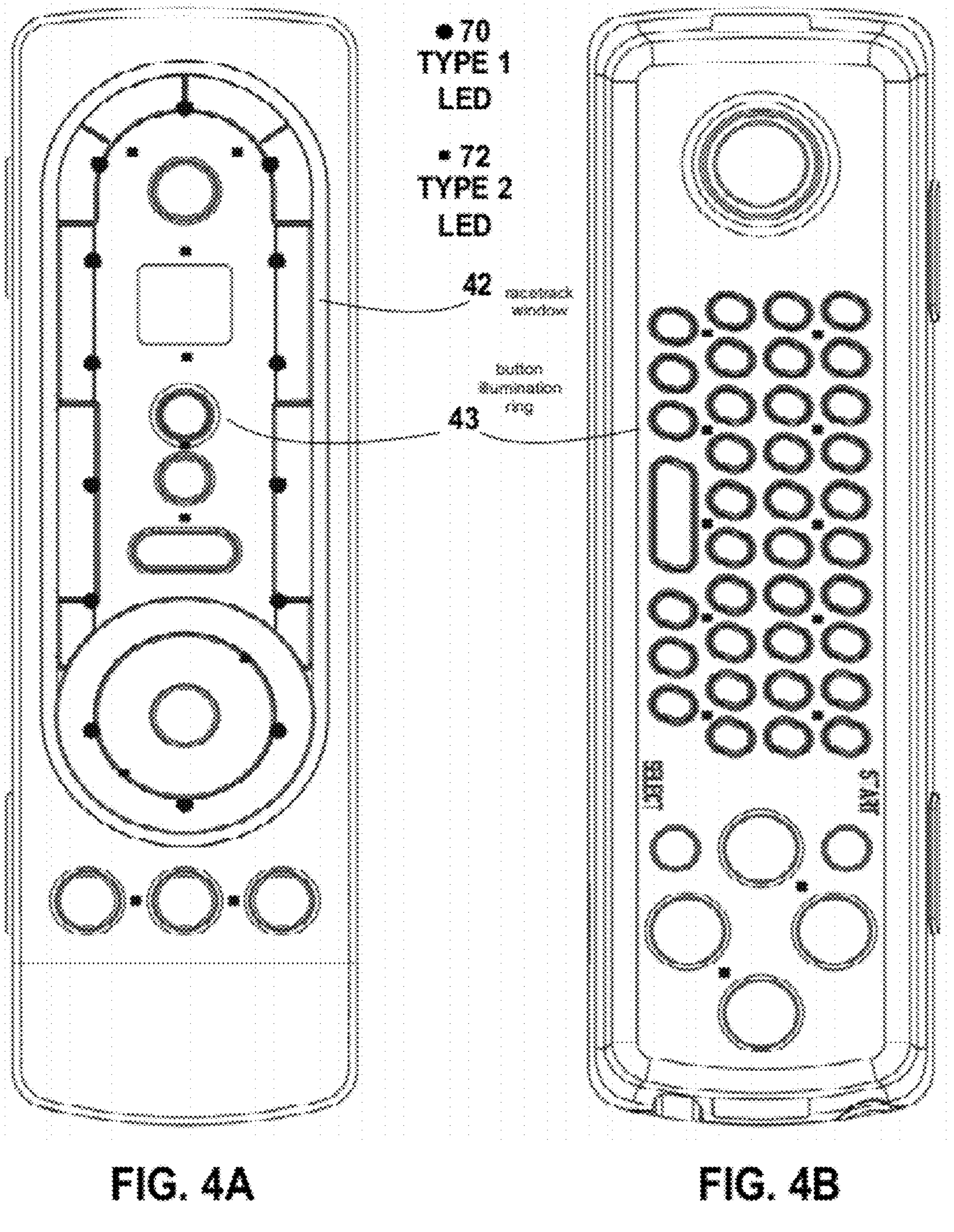
FIG. 4A is a top view of the PCU showing the placement of two different types of LEDs.
FIG. 4B is a bottom view of the PCU showing the placement of LEDs.

Referring to FIGS. 4A, B, in a preferred embodiment, the illumination for the racetrack window 42 is provided by a first illumination source 70, and illumination for illumination rings 43 of the buttons is provided by a second illumination source 72, both located within the body of the PCU 10.

Ideally, the illumination sources 70, 72 are one or more LEDs, which are low-power and cool-operating devices, although any known form of illumination, such as incandescent sources, fluorescent sources, etc. may be utilized.

When LEDs are used as the illumination source 70, 72, it is possible to incorporate LEDs of a particular color, or, preferably, to include RGB LEDs whose colors can be mixed to provide for a huge array of colors, including white.

Accordingly, the PCU 10 may incorporate control electronics for controlling the brightness level, or, when RGB LEDs are used, the color of the LEDs collectively, in groups, or individually. Alternately, the control electronics can be located externally to the PCU 10, with control signals being communicated via the communications cable 12 or wirelessly. Color settings for RGB LEDs can be maintained via tables in which brightness values for each of the RGB components is provided to establish a particular color.

Regardless of where the LED control electronics are located, the actual control of the illumination sources 70,72 can be done by the passenger via the PCU 10 itself, or, alternately, can be done by an overall lighting control system of the aircraft in order to mimic the mood lighting color of the cabin. For example, a controller could be provided that inputs or generates information related to light color and intensity information of cabin lighting, and provides information to the PCU 10 that would permit the PCU 10 to mimic the cabin lighting color.

In a preferred embodiment, the Type 1 LEDs 70 are used to illuminate the racetrack window 42 and these are comprised of RGB LEDs and are located in a pattern that generally matches the oval shape of the racetrack. Although any known RGB LED can be utilized, observing the following guidelines will help ensure consistency of color and brightness.

As can be seen in FIG. 4A, there are fourteen generally equally spaced Type 1 LEDs 70 so as to provide the desired illumination effect, which has proven adequate, when combined with the translucent support layer 52 and the racetrack window 42 to provide a generally even illumination of the window 42. The fourteen Type 1 LEDs represent a preferred embodiment that achieves the desired lighting effect while at the same time does not draw an excessive amount of power.

In a preferred embodiment, some level of shielding is provided between the Type 1 70 and Type 2 72 LEDs so that the lighting effects can be controlled independent of one another.

All of the LEDs 70 should be of the same type and purchased from the same vendor. This helps to ensure consistency. Ideally, all of the Type 1 LEDs 70 on a given PCU 10 would be purchased from the same lot to avoid any variation in LED characteristics due to variations in the LED manufacturing process.

The spacing of the racetrack LEDs 70 should be approximately 0.5" to 0.75" apart, and ideally these are not placed directly under the racetrack window 42 in order to help diffuse the light from these LEDs 70 and avoid hot-spotting. To achieve this, a spacing of approximately 0.125" between the LEDs 70 and the bottom surface of the racetrack window 42 can be used. Furthermore, in order to maximize color consistency, the orientation of the RGB LEDs 70 should be maintained so that the same color on the LED chip faces the racetrack window 42.

In addition to the Type 1 LEDs 70, Type 2 LEDs 72 may be provided as well. These are preferably white LEDs and serve the purpose of providing illumination around the borders of some or all of the keys. A small gap is provided around various keys that creates an illumination ring 43. Although preferably no separate layer is provided, a small gap between the key and the housing is sufficient to allow illumination from the Type 2 LEDs 72 to surround the key. The translucent support layer 52 helps to diffuse the light from the Type 2 LEDs 72 so as to provide even illumination around the keys. As can be seen in the embodiment shown in FIG. 4A, ten Type 2 LEDs 72 are provided for the top surface, and twelve Type 2 LEDs 72 are provided for the bottom surface.

Figure 4C:
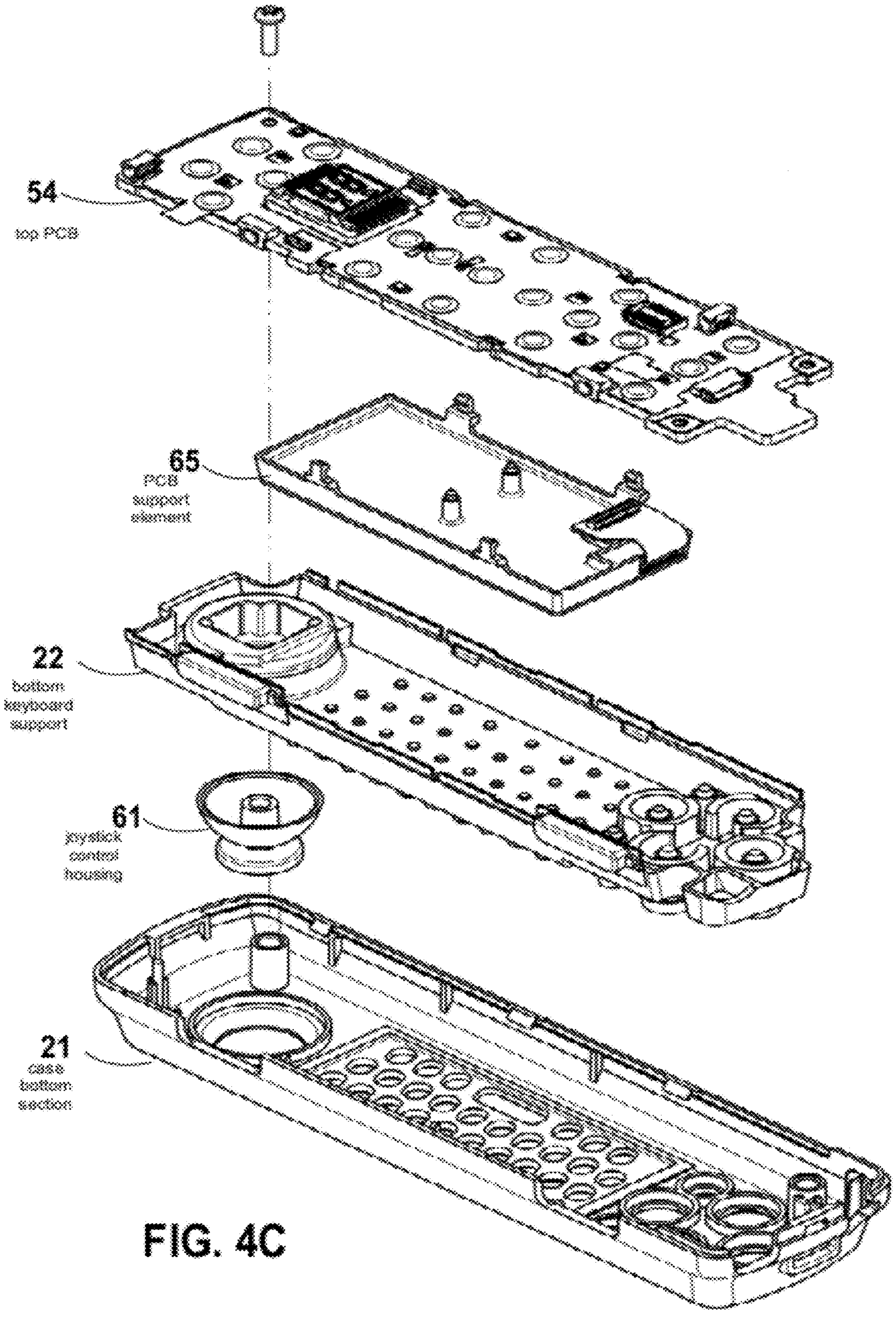
FIG. 4C is an exploded perspective assembly view of a bottom portion of the PCU.
Figure 4D:
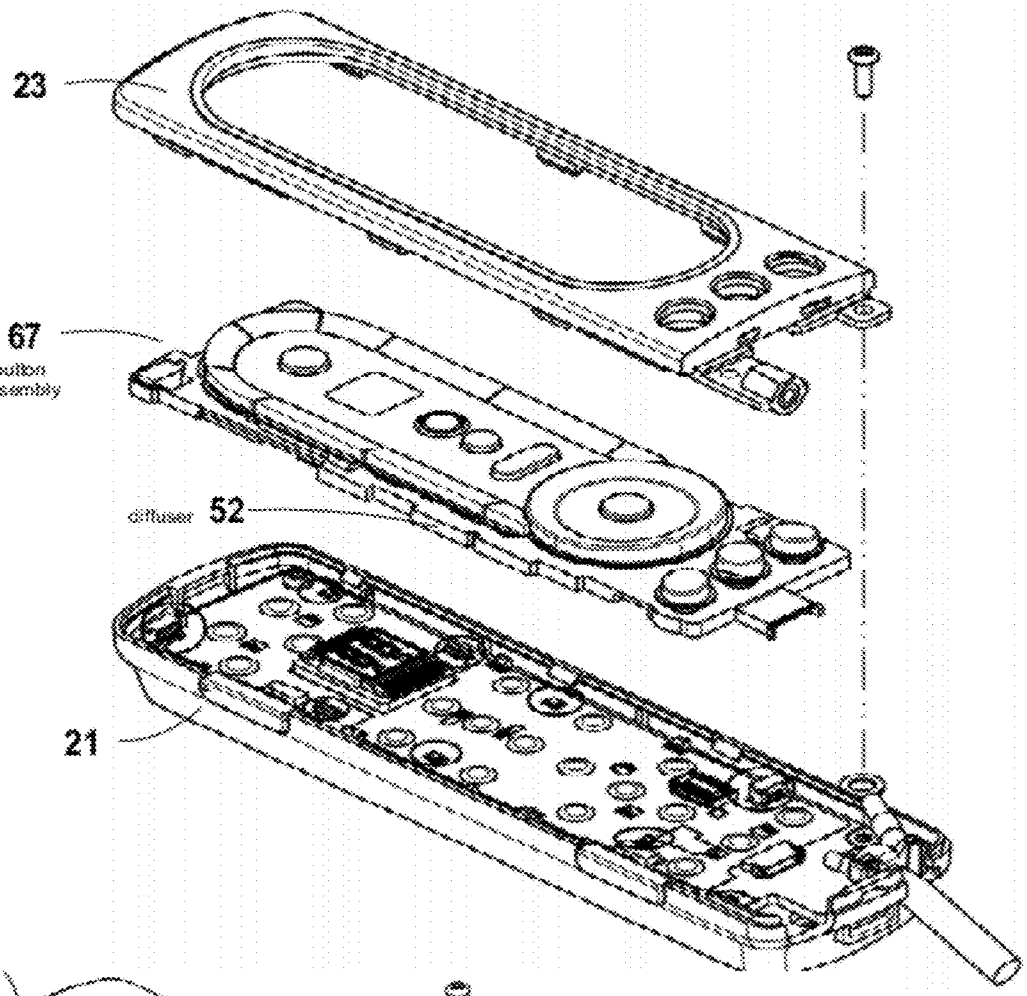
FIG. 4D is an exploded perspective assembly view of the middle and top portions of the PCU.
Figure 4E:
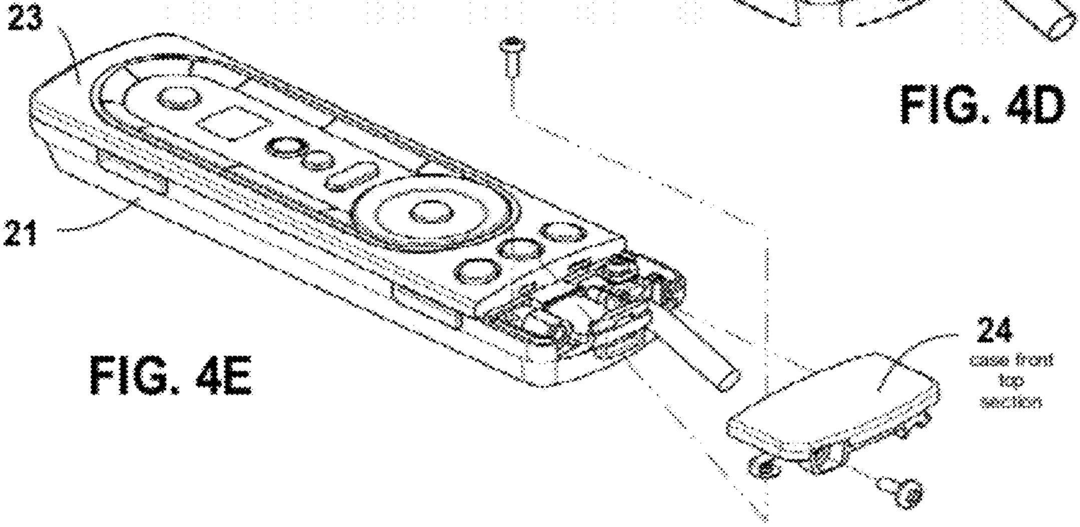
FIG. 4E is an exploded perspective assembly view of the final assembly part of the PCU.
Figure 4F:
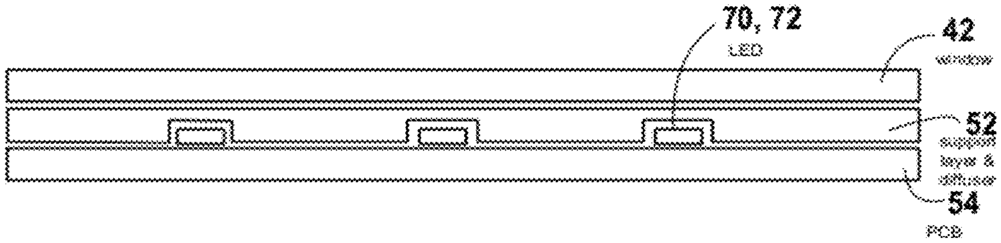
FIG. 4F is a section view illustrating the layers associated with the LEDs.

Referring to FIG. 4F, in a preferred embodiment, a PCB 54 comprising the illumination sources (e.g., LED 70, 72), is covered with a key support layer 52 that also serves as a light diffuser. Preferably, this is made of a silicon membrane that has 0.03-0.05% white pigment added to it. With this construction, the thin region of the key support layer and diffuser 52 over the illumination source 70, 72 can be made approximately 0.03-0.04" thick and this can serve to adequately help diffuse the light from the LED 72. Other regions of the support layer can be thicker, e.g., up to 0.1" and have structural features that provide integrity and support to this layer 52.

Above this is a racetrack window 42. The window 42 can be made of clear acrylic (PMMA) or any material with similar properties and may be formed by an injection molding process. It is designed to have a bottom surface inside of the case 20 and a top surface on the outside of the case. In order to aid in the diffusion, the window 42 may be textured on a top side, a bottom side, or both sides in order to provide a further diffusing aspect to the light. When the translucent support layer 52 is used in combination with the racetrack window 42, a maximum diffusing effect is achieved that nearly eliminates variation in the illumination level at various portions along the racetrack window. The structural support for the respective keys and supporting circuitry is provided by the top printed circuit board (PCB) 54 and the bottom PCB 66.

It is desirable to remove the LEDs 70, 72 from the racetrack windows as far as the other elements of the PCU 10 will permit. In this way, the diffusing nature of the racetrack window 42 can implement as uniform of a lighting as is possible.

FIGS. 4C-4E are exploded perspective assembly views that illustrate how the main portions of PCU are assembled. Referring to FIG. 4C, the case bottom section 21 is provided with the joystick control housing 61 that protrudes through a hole in the bottom section 21. On top of the bottom section 21, the bottom keyboard support 22 is provided, which preferably is made of the same material that the key support layer 52 is so that it can perform a similar diffusing function with regard to the keyboard on the bottom. As noted above, preferably the white Type 2 LEDs 72 are the ones that provide the lighting to the bottom keyboard and the colored Type 1 LEDs 70 are shielded so that their light does not combine with the Type 2 LEDs 72. A PCT support element 65 is provided in order to support the top PCB 54 that contains circuitry associated with the PCU.

FIG. 4D shows the next stage of assembly in which the button assembly 67 comprising the diffuser 52 is placed on the top PCB 54, and is subsequently covered with the case top section 23. FIG. 4E illustrates the final assembly step of adding the case front top section 24.

Second Embodiment

Figure 5C:
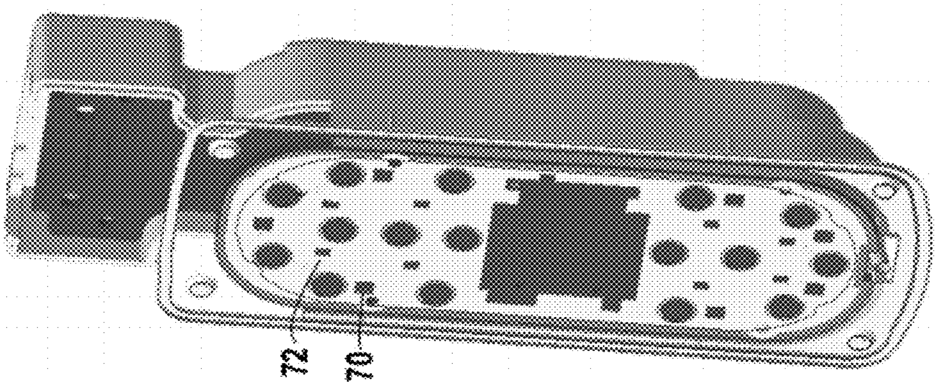
FIG. 5C is an isometric view of the embodiment shown in FIG. 5B with further structure removed and showing the placement of the different types of LEDs.
Figure 5B:
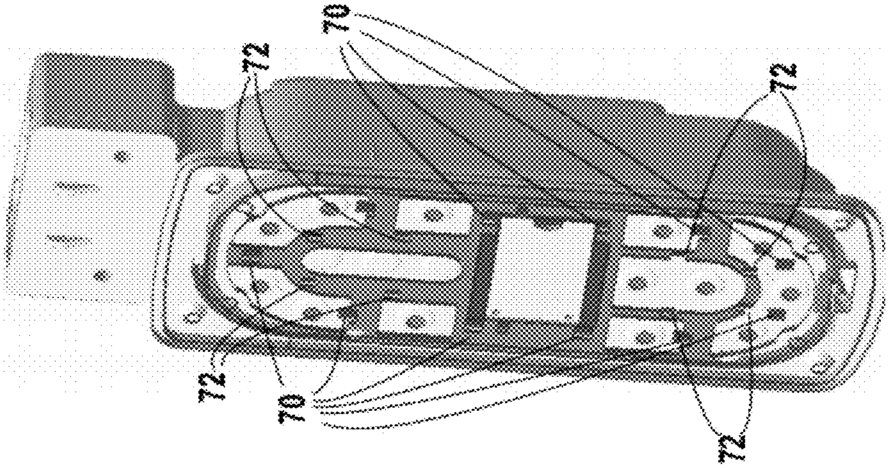
FIG. 5B is an isometric view of the embodiment shown in FIG. 5A with the key support layer removed and showing the placement of the different types of LEDs.
Figure 5A:
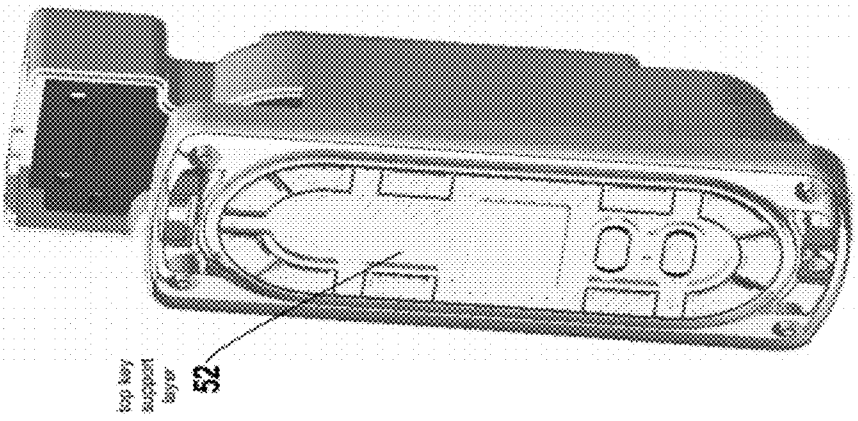
FIG. 5A is an isometric view of another embodiment of the PCU, with the keyboard layer removed and showing the top key support layer.

FIGS. 5A-C are isometric views of a second embodiment of the invention having a deeper body and omitting the bottom keyboard layer. The top portions are generally the same as the first embodiment discussed and illustrated above. FIG. 5A shows the PCU with the layer comprising the keys removed to expose the top key support layer 52. In a preferred embodiment, this support layer 52 is provided as a single-piece unit that covers the entire racetrack area.

FIG. 5B illustrates the portion of the PCU underlying the top key support layer 52. In this illustration, the positioning of the Type 1 and Type 2 LEDs 70, 72 can be clearly seen. FIG. 5C shows the PCU with most of the supporting button structure removed.

Figure 6A:
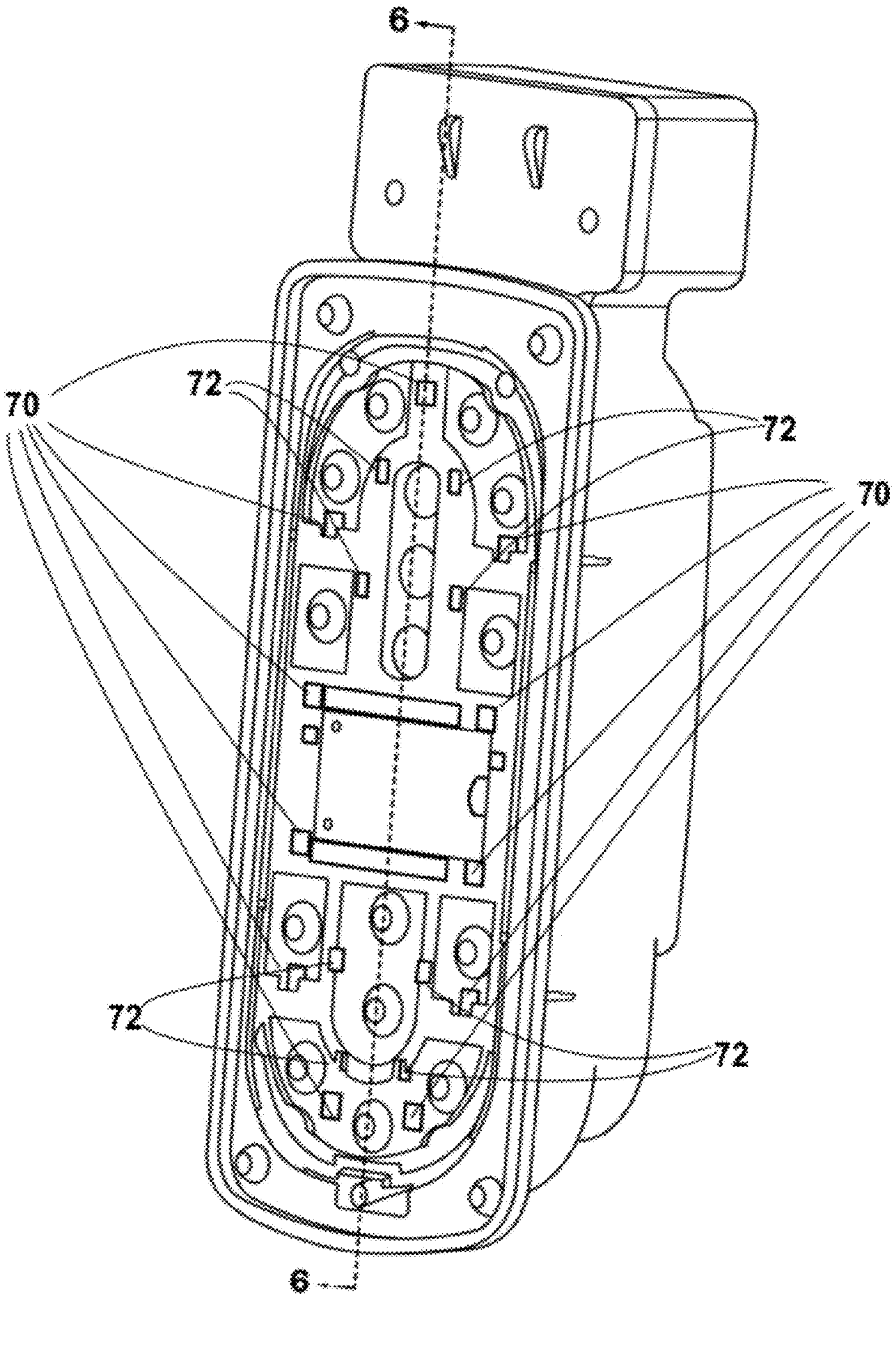
FIG. 6A is an isometric view corresponding most closely to FIG. 5B showing the relevant features.

FIG. 6A is an isometric view that clearly shows the positional relationship between the buttons (or rather the underlying button support structure) and the LEDs 70, 72. With the spacing illustrated in FIG. 6, a very even illumination effect can be provided.

Figure 6B:
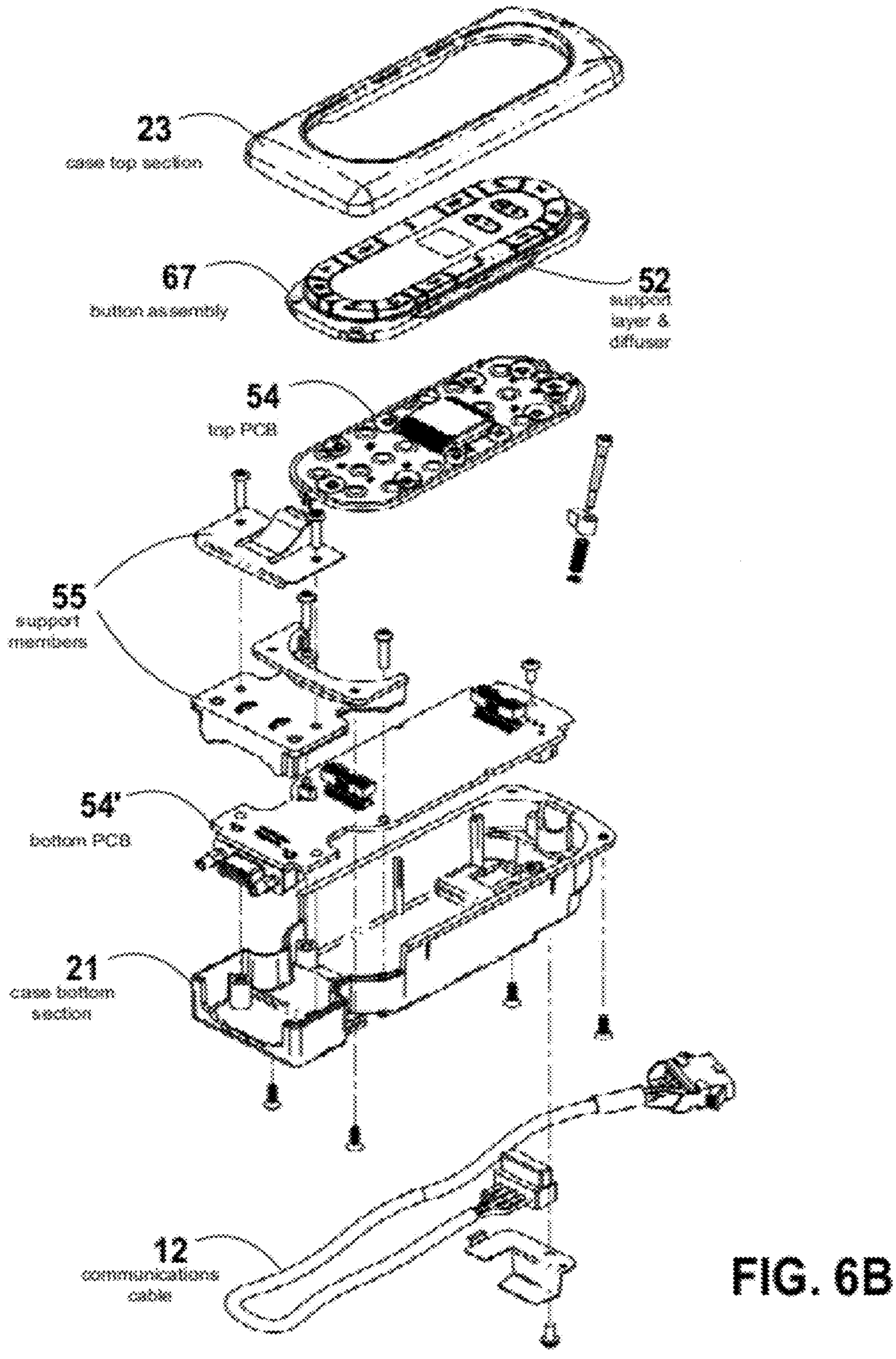
FIG. 6B is an exploded assembly view of the embodiment shown in FIG. 5A.

FIG. 6B is a perspective assembly diagram for the second embodiment that illustrates the case bottom section 21 having a bottom PCB 54' affixed to it. Additional support members 55 are provided and are used to support the top PCB 54 and structure above that. The button assembly 67 is similar to that of the first embodiment, and also comprises a support layer and diffuser 52 that works in a similar manner. A case top section 23 is provided, and does not require an additional piece as illustrated in the first embodiment. A communications cable 12 may be used to communicate with this device, although any form of wireless connection can also be utilized.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

TABLE OF REFERENCE CHARACTERS

| | |
|---|---|
| 10 | tethered personal control unit |
| 12 | communication cable |
| 20 | case |
| 21 | case bottom section |
| 22 | bottom keyboard support |
| 23 | case top section |
| 24 | case front top section |
| 30 | directional movement disk |
| 40 | racetrack |
| 42 | racetrack window |
| 43 | button illumination ring |
| 44 | window |
| 46 | imitation button |
| 52 | top keyboard support layer & diffuser |
| 54 | top PCB |
| 54' | bottom PCB |
| 55 | support members |
| 60 | joystick control |
| 61 | joystick control housing |
| 62 | keyboard |
| 64 | bottom keyboard support layer |
| 65 | PCB support |
| 66 | bottom PCB |
| 67 | button assembly |
| 70 | type 1 LED |
| 72 | type 2 LED |
| $PB_{1-13}$ | push buttons |
| $RTB_{1-5}$ | racetrack buttons |

What is claimed is:

1. A personal control unit (PCU) for controlling an entertainment or communications system in a vehicle, comprising:

a case;

a top surface comprising a rounded and elongated region comprising:

a plurality of user control elements; and one or more illumination regions;

an illumination source or sources located within the case, wherein the illumination source comprises a plurality of light-emitting diodes (LEDs) including at least two different types of the LEDs, and illumination from the illumination source is transmitted through the one or more illumination regions to a user of the PCU; and an illumination diffuser located between the illumination source and the illumination regions of the top surface, wherein the rounded and elongated region is race-track shaped, comprising two semi-circles at opposite ends joined by parallel lines, wherein a first type of the LEDs are laid out to positionally correspond with a border of the rounded and elongated region to illuminate a region adjacent to the border of the rounded and elongated region, and a second type of the LEDs are laid out positionally to reside within the rounded and elongated region and more towards a center of the rounded and elongated region than the first type of the LEDs.

2. The PCU as claimed in claim 1, wherein the first type LEDs comprise fourteen in number.

3. The PCU as claimed in claim 1, wherein the first type LEDs are colored.

4. The PCU as claimed in claim 3, wherein the first type LEDs are color adjustable.

5. The PCU as claimed in claim 1, wherein the second type LEDs comprise ten in number.

6. The PCU as claimed in claim 1, wherein the second type LEDs are white.

7. The PCU as claimed in claim 1, further comprising, a controller for varying an attribute of the illumination source.

8. The PCU as claimed in claim 7, wherein the attribute is brightness.

9. The PCU as claimed in claim 7, wherein the attribute is color.

10. The PCU as claimed in claim 7, wherein the illumination source comprises a first type LED and a distinct second type LED, and wherein the first type LED and the second type LED are separately controllable by the control.

11. The PCU as claimed in claim 7, wherein the controller is user controllable during normal operation.

12. The PCU as claimed in claim 1, wherein the diffuser is comprised of a translucent flexible material.

13. The PCU as claimed in claim 12, wherein the material is rubberized silicon.

14. The PCU as claimed in claim 12, wherein a thickness of the diffuser over one or more of the LEDs is approximately 0.03-0.04".

15. The PCU as claimed in claim 1, wherein the diffuser is comprised of a single piece of material.

16. The PCU as claimed in claim 1, further comprising a bottom surface comprising a keyboard with keys.

17. The PCU as claimed in claim 16, further comprising a separate light diffuser and for the bottom keys.

18. The PCU as claimed in claim 1, further comprising:

an isolation element for isolating illumination from the first type LEDs and the second type LEDs from mixing together.

19. The PCU as claimed in claim 1, further comprising a transparent or translucent border window bordering the rounded and elongated region, the window comprising a layer above the diffuser.

20. The PCU as claimed in claim 19, wherein the border window is made of acrylic.

21. The apparatus PCU as claimed in claim 19, wherein the border window is textured to further diffuse lighting on at least one of its top and bottom surface.

22. The apparatus PCU as claimed in claim 19, wherein the illumination sources comprise a plurality of RGB LEDs that are oriented so that a same-colored end faces the border window.

* * * * *

UNITED STATES PATENT AND TRADEMARK OFFICE

CERTIFICATE OF CORRECTION

PATENT NO. : 8,147,080 B2
APPLICATION NO. : 12/416278
DATED : April 3, 2012
INVENTOR(S) : Foreman et al.

It is certified that error appears in the above-identified patent and that said Letters Patent is hereby corrected as shown below:

In the Claims:

Column 10, Claim 21, Line 11: Please correct "The apparatus PCU" to read -- The PCU --

Claim 22, Line 14: Please correct "The apparatus PCU" to read -- The PCU --

Signed and Sealed this
Fourteenth Day of August, 2012

David J. Kappos
*Director of the United States Patent and Trademark Office*